Nov. 17, 1942.  J. D. HULSMANN  2,302,029
VALVE APPARATUS
Original Filed March 4, 1938
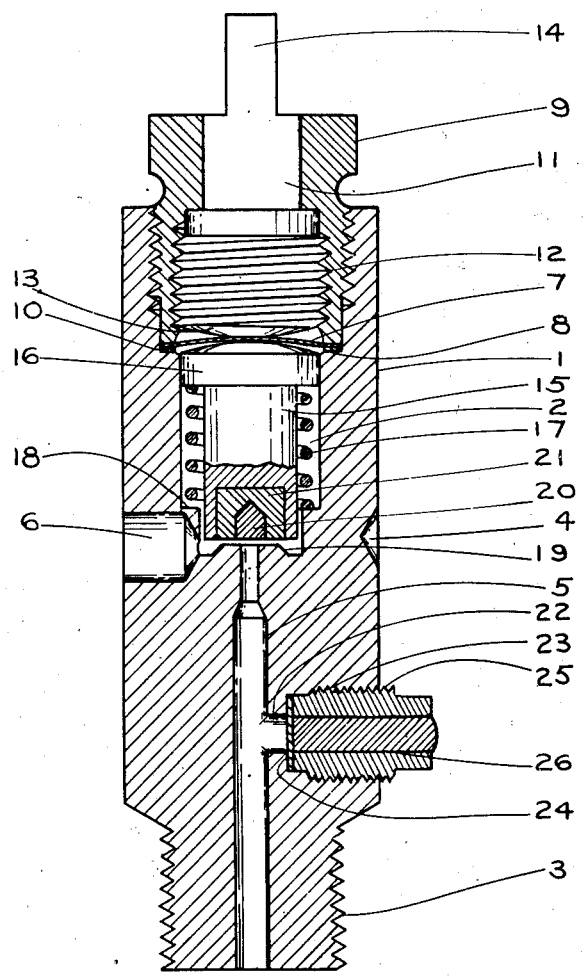
J. D. Hulsmann
INVENTOR
BY Frank Wilen
ATTORNEY Patented Nov. 17, 1942

2,302,029

UNITED STATES PATENT OFFICE 2,302,029

VALVE APPARATUS

Johannes D. Hulsmann, Paterson, N. J., assignor to E. R. Squibb & Sons, New York, N. Y., a corporation of New York Original application March 4, 1938, Serial No. 193,830. Divided and this application June 25, 1940, Serial No. 342,202

3 Claims. (Cl. 251—27)

This application is a division of application Serial No. 193,830, filed March 4, 1938, now Patent No. 2,209,956, granted Aug. 6, 1940.

This invention relates to improvements in devices for controlling the passage of fluids, especially valves of the packless type designed to be employed for gases or liquids under high pressure. Many valves of this type embody a soft-metal insert in the seat-face of the valve stem, which insert, on shutting off the valve, tends to conform to the valve seat and passageway so as to effect a more positive closing. In valves so constructed, however, the soft metal of the insert tends to extrude into the passageway and hence necessitate a compensating increase in the lift of the valve stem to free the passageway; and since the stroke of the valve stems in valves of the packless type is short, the necessary compensation may easily exceed that permitted by the stroke, and thus render the valve inoperative. Moreover, the extruded soft-metal tends to cause the valve stem to stick to the valve seat and resist opening the valve.

It is the object of this invention to provide an improved device for controlling the passage of fluids—especially a valve of the packless type for dispensing anesthetic gases—which is simple, efficient, and substantially free of the aforementioned defects.

Essentially, the improved device of this invention comprises a valve seat having a passageway leading thereto, a valve stem having a relatively soft insert in its seat face, and a hard plug carried by the insert and adapted to cover the passageway. Preferably the plug is of hard metal and is carried by a soft-metal insert in the seat face of the valve stem.

The nature and advantages of this invention will be readily understood from the following detailed description, considered with the accompanying drawing, in which the figure is a vertical sectional view of a valve embodying the invention.

In the drawing, 1 designates generally a metal valve body provided (as by boring and counter-boring) at one end with a cylindrical valve chamber 2, and at the other end with a standard externally-threaded extension 3 adapted to be coupled with a standard gas cylinder. The valve shown is adapted to fit in the yoke of an anesthetizing machine, being suitably clamped therein as at depression 4 on the side of the valve body. An axial passageway 5 leads from the bottom of extension 3 to the valve chamber, and a side exit 6 leads from the valve chamber to a gas-dispensing machine (not shown).

Valve chamber 2 is divided into two parts by a flexible sealing diaphragm 7, resting on an annular shoulder 8 and clamped thereto by means of an axially-apertured, externally-threaded compression nut 9 screwed into the correspondingly internally-threaded upper part of chamber 2. A resilient gasket 10 (e. g., of fiber) is interposed between the diaphragm edge and shoulder 8 to assure perfect contact. A valve-stem screw 11, externally-threaded as at 12, operates in the axial aperture of the compression nut, which has a corresponding internal threading. The valve-stem screw has a convex bottom 13 to which a suitable lubricant may be applied to permit ready rotation while engaging and flexing the diaphragm 7; and the top 14 of the valve-stem screw is noncircular in cross section or otherwise adapted to receive a handwheel (not shown) or other operating means.

The lower part of the valve chamber 2 is occupied by a valve stem 15 having an enlarged head 16 slidable in the chamber; the top of the head is convex and is held in contact with (and consequently follows the motion of) the bottom of diaphragm 7 by means of a coiled tension spring 17 surrounding the valve and retained between the head and an annular ledge 18 in the chamber. Passageway 5 terminates in a raised valve seat 19 at the bottom of the chamber, the seat being adapted to cooperate with the lower face of the valve stem 15 in controlling the passage of gas. Preferably, the valve stem and spring are cadmium-plated to prevent corrosion.

The lower face of the valve stem embodies a soft-metal insert but is specially constructed to obviate the defects incident to extrusion of the soft metal into the passageway 5. In this construction, the passageway is covered by a "floating" plug 20 of hard metal (e. g., drill rod) larger in diameter than the passageway, the plug being set in (and carried by) a soft-metal or soft-alloy insert 21 (e. g., a mixture of copper, tin, and lead) in the seat-face of the valve stem. The hard-metal plug prevents access of the soft metal to the passageway, the contact of the remaining surface of the soft-metal insert with the valve seat effecting a complete shutoff.

In operating the valve (shown open in the drawing), clockwise rotation of valve-stem screw 11 to thread it downward flexes diaphragm 7 downward, which in turn forces valve-stem 15 down (against the action of spring 17) to close passageway 5. The reverse rotation of the valve-stem screw permits the spring 17 to act in opening the valve, the plug construction—by preventing extrusion—enabling ready release of the valve stem from the valve seat.

If required, passageway 5 may be provided with a safety passage 22 having an enlarged, internally-threaded exit 23. The safety passage is closed by a soft-metal rupture disc 24 clamped between the base of the enlarged exit 23 and an axially-apertured, externally-threaded plug 25, the aperture of which is filled with a fusible filler 26 (e. g., an alloy which is 30% lead and 70% tin). This safety plug permits the escape of the gas content of a container to which the valve is attached when the surrounding temperature reaches the melting point of the fusible filler.

The invention may be variously otherwise embodied, within the scope of the appended claims.

I claim:

1. In a device for controlling the passage of fluids, an even valve-seat having a passageway leading thereto, a valve stem having in its seat face a relatively soft insert contacting the valve-seat to the exclusion of the valve stem, and a hard plug carried solely by the insert and providing therewith an even seat-contacting surface, the plug covering the passageway and preventing extrusion of the insert thereinto.

2. In a device for controlling the passage of fluids, an even valve-seat having a passageway leading thereto, a valve stem having in its seat face a soft-metal insert contacting the valve-seat to the exclusion of the valve stem, and a hard-metal plug carried solely by the insert and providing therewith an even seat-contacting surface, the plug covering the passageway and preventing extrusion of the soft metal thereinto.

3. In a device for controlling the passage of fluids, an even valve-seat having a passageway leading thereto, a valve stem having in its seat face a relatively soft insert covering the entire valve-seat, and a hard plug carried solely by the insert and providing therewith an even seat-contacting surface, the plug covering the passageway and preventing extrusion of the insert thereinto.

JOHANNES D. HULSMANN.